(12) United States Patent
Brady

(10) Patent No.: US 6,422,133 B1
(45) Date of Patent: Jul. 23, 2002

(54) FRENCH PRESS COFFEE MAKER WITH ASSEMBLY TO REDUCE CONTACT OF GROUNDS WITH LIQUID COFFEE AFTER TERMINATION OF STEEPING PERIOD

(76) Inventor: Frank A. Brady, 3166 Blackhawk Meadows Dr., Danville, CA (US) 94506

( * ) Notice: Subject to any disclaimer, the term of this patent is extended or adjusted under 35 U.S.C. 154(b) by 5 days.

(21) Appl. No.: 09/586,717

(22) Filed: Jun. 5, 2000

(51) Int. Cl.⁷ ................................................ A47J 31/06
(52) U.S. Cl. .......................................... 99/297; 99/287
(58) Field of Search ................................ 426/433, 431, 426/432, 435, 234, 241, 594, 597; 99/297, 287

(56) References Cited

U.S. PATENT DOCUMENTS

| | | |
|---|---|---|
| 5,461,968 A | 10/1995 | Portman |
| 5,780,087 A * | 7/1998 | Brady |
| 5,809,867 A * | 9/1998 | Turner et al. |
| 6,079,316 A * | 6/2000 | Barden et al. |
| 6,231,909 B1 * | 5/2001 | Levinson |

* cited by examiner

Primary Examiner—Anthony J. Weier
(74) Attorney, Agent, or Firm—Morrison & Foerster LLP

(57) ABSTRACT

A steeping apparatus is for steeping a granular solid food material in a liquid to impart a flavor of the solid food material to the liquid to produce a flavored beverage. The apparatus includes a container to hold the solid food material and the liquid. A plunger is movable vertically with respect to the container between an upper plunger position and a lower plunger position. The plunger includes a filter element that, as the plunger is moved from the upper plunger position to the lower plunger position, permits the flow of liquid therethrough but that substantially inhibits the passage of solid food material therethrough. A buffer element is situated above the plunger and is movable with respect to the container from an upper buffer element position to a lower buffer element position. When the buffer element is at the lower buffer element position, the granular solid food material is substantially decoupled from the flavored beverage.

10 Claims, 1 Drawing Sheet

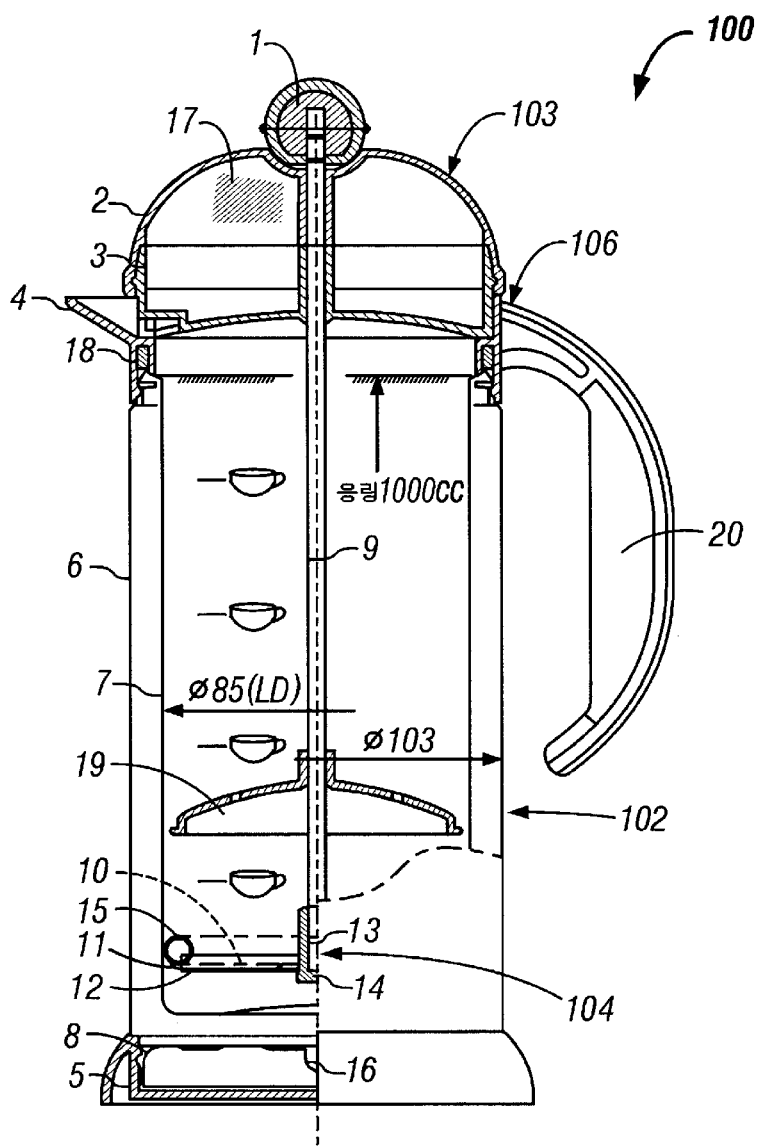
FIG. 1
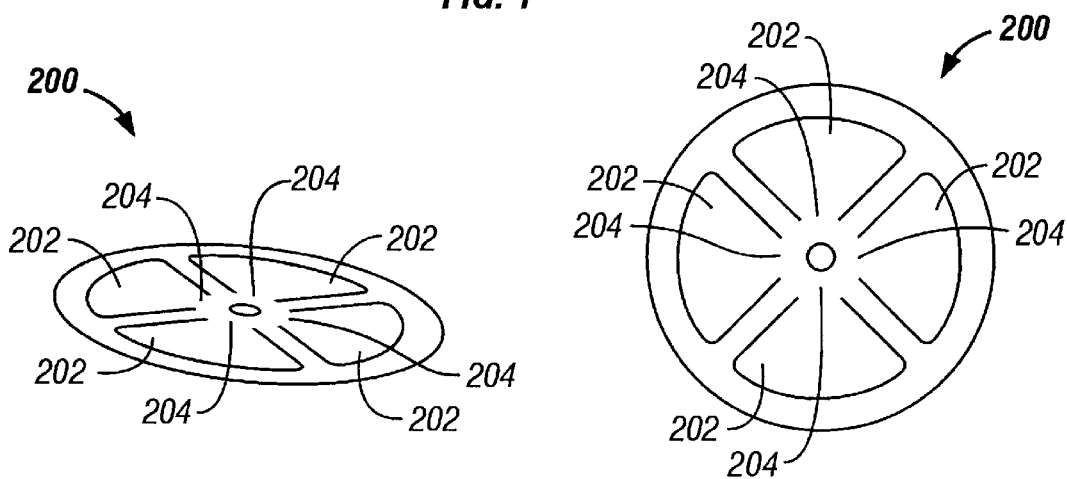
FIG. 2A   FIG. 2B

FRENCH PRESS COFFEE MAKER WITH ASSEMBLY TO REDUCE CONTACT OF GROUNDS WITH LIQUID COFFEE AFTER TERMINATION OF STEEPING PERIOD

TECHNICAL FIELD

The present invention is in the field of French press coffee makers and, more particularly, is directed to a French press coffee maker that includes an assembly to selectively reduce the contact of the coffee grounds with the liquid coffee.

BACKGROUND

It is well known to use French press coffee makers to "steep" coffee. Namely, boiling water is mixed with finely ground coffee in a container. The coffee is held in place between two perforated discs in the container. After the coffee is allowed to steep for several minutes, one presses down on a handle, thus containing the grinds in the bottom of the coffee maker. The coffee can then be poured (or drunk directly from) the container while the grounds are prevented from flowing out of the container.

A disadvantage with French-press coffee makers is that, as the grounds remain in contact with the water past the preferred steeping period, the coffee tends to become very strong and bitter, or just plain "funky" tasting. Thus, it is generally recommended to remove the coffee right at the end of the preferred steeping period.

One solution is to remove the prepared coffee right at the end of the preferred steeping period. However, this is impractical in some situations. For example, one might have a French-press-type commuter mug. It would be impractical to remove the coffee from the mug while commuting. As another example, thermal carafe French-press coffee makers are quite common, as they conveniently keep the coffee contained within them hot while the coffee sits, for example, at a dining table after a meal. In this case, the convenience would be compromised by having to remove the coffee (or grounds) at the end of the preferred steeping period.

SUMMARY

A steeping apparatus is for steeping a granular solid food material in a liquid to impart a flavor of the solid food material to the liquid to produce a flavored beverage. The apparatus includes a container to hold the solid food material and the liquid. A plunger is movable vertically with respect to the container between an upper plunger position and a lower plunger position. The plunger includes a filter element that, as the plunger is moved from the upper plunger position to the lower plunger position, permits the flow of liquid therethrough but that substantially inhibits the passage of solid food material therethrough. A buffer element is situated above the plunger and is movable with respect to the container from an upper buffer element position to a lower buffer element position. When the buffer element is at the lower buffer element position, the granular solid food material is substantially decoupled from-the flavored beverage.

BRIEF DESCRIPTION OF FIGURES

FIG. 1 illustrates a French-press coffeepot in accordance with an embodiment of the invention.

FIG. 2A illustrates a perspective view of a buffer assembly of the FIG. 1 coffeepot, and FIG. 2B illustrates a top view of the buffer assembly.

DETAILED DESCRIPTION

FIG. 1 illustrates—in partial breakaway—a French-press coffee maker 100 in accordance with an embodiment of the invention. The French-press coffee maker 100 in accordance with this embodiment includes a thermal carafe (insulated) container 102. In other embodiments, the container is made of other materials, insulated or otherwise, such as glass, non-insulated stainless steel, or plastic. Attached to the container 102 is a handle 20, and the container also includes a spout 4. The coffee maker 100 further includes a removable lid 103 that, when removed from the container 102, exposes an opening 106 at the top of the container 102 and otherwise covers the opening 106.

The coffee maker 100 also includes a plunger assembly 104, including a screen 10 held in place over a perforated disc 12 by a spring 15. The plunger assembly 104 is attached to a shaft 9 that protrudes through the lid 104. The upper end of the shaft 9 terminates at a knob 1. Also attached to the shaft 9 is a buffer assembly 19, which is discussed in greater detail later. (The shaft 9 is shown in FIG. 1 as a cylindrical rod, but the shaft is not limited to having any particular shape.)

In use, a user removes the lid 103, along with the plunger assembly 104, and pours into the container 102 coffee grounds and boiling water. The user then replaces the lid but leaves the shaft 9 in a raised position so that the plunger assembly 104 is near or above the top surface of the water in the container 102, so that the water can freely interact with the grounds. After a steeping period, the user then uses the knob 1 to lower the shaft 9 such that the grounds are trapped beneath the plunger assembly 104, and the resulting coffee can be poured from the container 102 via the spout 4.

The buffer assembly 19 is now discussed in greater detail. Basically, the buffer assembly 19 serves to reduce the contact of the liquid coffee with the grounds after the end of the steeping period. In the FIG. 1 embodiment, the buffer assembly 19 is a relatively solid (relative to the plunger assembly 104) dome-shaped member attached to the shaft 9 at a distance above the plunger assembly 104. In this embodiment, the buffer assembly 19 does not contact the inner wall of the container 102. This is in contrast to the plunger assembly, which due to the spring 15, makes sliding contact with the inner wall of the container 102. In other embodiments, the buffer assembly does contact the inner wall of the container 102 but the dome-shaped (or other shaped) member is "less solid" so that liquid may pass through it. In any event, the object of the buffer assembly 19 is to lessen the coupling of the grounds from the already-steeped coffee. It is recognized that in many embodiments there will be some amount of already-steeped coffee that is not decoupled from the grounds (i.e., the coffee between the plunger assembly 104 and the buffer assembly 19). However, in some embodiments, some level of coupling is tolerated as the buffer assembly 19 could not be easily lowered if it did allow for some level of coupling.

FIGS. 2A (perspective view) and 2B (top view) illustrate a buffer assembly 200 in accordance with one embodiment of the invention. As discussed above, it is preferable for the buffer assembly 200 to decouple the grounds from the already-steeped beverage as much as possible. However, typically, the greater the amount of decoupling the more difficult it is to lower the buffer assembly 200 through the beverage. The buffer assembly 200 in FIGS. 2A and 2B addresses this issue by providing a "valve" that opens as the buffer assembly is pushed down through the beverage, but that closes when the buffer assembly is in place.

Specifically, the buffer assembly 200 includes flexible "wings" 202 that have an attachment point 204 to the remainder of the buffer assembly 200 but are otherwise not connected to the remainder of the buffer assembly 200. As the buffer assembly 200 is pushed down through the beverage, the wings 202 flex up at their attachment point 204 to create an opening that allows the beverage to more easily pass through the buffer assembly 200. But otherwise, when the buffer assembly 200 is not moving, the wings 202 are not flexed up and thus close the opening to more completely decouple the beverage from the grounds.

While a "wing" valve embodiment has been described, other types of valves may be employed.

Because of the decoupling effect provided by the buffer assembly 19, the coffee remains fresh-tasting for a longer time than if the buffer assembly 19 were not present.

What is claimed is:

1. A steeping apparatus for steeping a granular solid food material in a liquid to impart a flavor of the solid food material to the liquid to produce a flavored beverage, comprising:

a container to hold the solid food material and the liquid;

a plunger movable vertically with respect to the container between an upper plunger position and a lower plunger position, the plunger including a filter element that, as the plunger is moved from the upper plunger position to the lower plunger position, permits the flow of liquid therethrough but that substantially inhibits the passage of solid food material therethrough; and a buffer element movable with respect to the container from an upper buffer element position to a lower buffer element position, wherein when the buffer element is at the lower buffer element position the granular solid food material is automatically substantially decoupled from the flavored beverage.

2. The steeping apparatus of claim 1, wherein:

the buffer element includes a valve that automatically opens as the buffer element is moved from the upper buffer element position to the lower buffer element position.

3. The steeping apparatus of claim 2, wherein:

the valve of the buffer element is automatically closed while the buffer element is at the lower buffer element position.

4. The steeping apparatus of claim 1, wherein:

the container includes a lid; and further including;

a shaft having a portion protruding through the lid to outside the container and to which the plunger and buffer element are attached, a knob attached to the portion of the shaft protruding through the lid.

5. The steeping apparatus of claim 4, wherein:

the plunger and buffer element are attached to the shaft so as to be in a fixed spatial relationship with each other.

6. The steeping apparatus of claim 1, wherein:

the buffer element is a substantially solid element; and the steeping apparatus is configured such that there is a space between the buffer element and the container.

7. The steeping apparatus of claim 1, wherein:

the steeping apparatus is configured such that the buffer element slidingly contacts the container; and the buffer element includes a plurality of holes for communication of the beverage from a top side of the buffer element to a bottom side of the buffer element.

8. The steeping apparatus of claim 5, wherein:

the buffer element is situated above the plunger.

9. A steeping apparatus for steeping a granular solid food material in a liquid to impart a flavor of the solid food material to the liquid to produce a flavored beverage, comprising:

a container to hold the solid food material and the liquid;

a plunger movable vertically with respect to the container between an upper plunger position and a lower plunger position, the plunger including a filter element that, as the plunger is moved from the upper plunger position to the lower plunger position, permits the flow of liquid therethrough but that substantially inhibits the passage of solid food material therethrough; and a buffer element movable with respect to the container from an upper buffer element position to a lower buffer element position, wherein when the buffer element is at the lower buffer element position the granular solid food material is substantially decoupled from the flavored beverage, wherein the buffer element includes a valve that opens as the buffer element is moved from the upper buffer element position to the lower buffer element position.

10. The steeping apparatus of claim 5, wherein:

the valve of the buffer element is closed while the buffer element is at the lower buffer element position.

* * * * *

UNITED STATES PATENT AND TRADEMARK OFFICE
CERTIFICATE OF CORRECTION

PATENT NO.      : 6,422,133 B1
DATED           : July 23, 2002
INVENTOR(S)     : Frank A. Brady It is certified that error appears in the above-identified patent and that said Letters Patent is hereby corrected as shown below:

Column 1,
Line 56, please replace "from-the" with -- from the --.

Column 4,
Line 44, please replace "claim 5," with -- claim 9, --.

Signed and Sealed this

First Day of April, 2003

JAMES E. ROGAN
*Director of the United States Patent and Trademark Office*